(12) United States Patent
Nakano et al.

(10) Patent No.: US 6,793,343 B2
(45) Date of Patent: Sep. 21, 2004

(54) PROJECTOR PROVIDED WITH COOLING MECHANISM

(75) Inventors: Hirohisa Nakano, Matsumoto (JP); Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/345,316

(22) Filed: Jan. 16, 2003

(65) Prior Publication Data

US 2003/0137640 A1 Jul. 24, 2003

(30) Foreign Application Priority Data

Jan. 23, 2002 (JP) ........................................ 2002-014829

(51) Int. Cl.[7] ........................ G03B 21/18; G03B 21/14; G03B 21/22; G03B 21/26
(52) U.S. Cl. ............................. 353/61; 353/57; 353/119
(58) Field of Search ............................ 353/52, 57, 58, 353/60, 61, 85, 119; 165/122, 126

(56) References Cited

U.S. PATENT DOCUMENTS 6,254,238 B1 * 7/2001 Takamatsu ................... 353/61
6,481,854 B1 * 11/2002 Sugawara et al. ............ 353/52
6,558,004 B2 * 5/2003 Ito et al. ...................... 353/57
6,595,645 B2 * 7/2003 Shiraishi et al. .............. 353/57
6,641,267 B2 * 11/2003 Ohishi et al. ................. 353/61

FOREIGN PATENT DOCUMENTS

JP          A 8-304739          11/1996      ........... G03B/27/28

\* cited by examiner

*Primary Examiner*—Rodney Fuller
*Assistant Examiner*—Melissa J Koval
(74) *Attorney, Agent, or Firm*—Oliff & Berridge, PLC

(57) ABSTRACT

A light source is disposed at an end of an optical unit (4) formed approximately in planarly-viewed L-shape and an axial-flow fan (6A) is disposed so that suction surface thereof opposes the light source, where an exhaust duct (6B) connected with the axial-flow fan (6A) and extending toward a front side of a projector (1) along a side of a lower case is disposed on the exhaust side of the axial-flow fan (6A), so that the axial-flow fan (6A) is spaced apart from an exhaust hole formed on the front side of the projector (1) and the exhaust flow from the axial-flow fan (6A) becomes parallel to an image projecting direction of a projection lens.

3 Claims, 13 Drawing Sheets

PROJECTOR PROVIDED WITH COOLING MECHANISM

BACKGROUND OF THE INVENTION

1. Field of the Invention

The present invention relates to a projector having a light source and a projection optical system for enlarging and projecting a light beam irradiated by the light source after being modulated in accordance with image information, in which an optical path from the light source to the projection optical system is approximately arranged in planarly-viewed L-shape.

2. Description of Related Art

Conventionally, a projector has been used for presentation at a conference, scientific society and exhibition. Such projector forms an optical image by modulating a light beam irradiated by a light source with an optical modulator in accordance with image information to enlarge and project the optical image.

In order to vividly display the projected optical image, luminance of the light source has to be improved, which accompanies heat generated on the light source. In order to efficiently cool the light source and prevent the heat from remaining inside the projector, a suction fan is ordinarily used.

In a projector having an optical path of planarly-viewed L-shape from the light source to the optical modulator, the suction fan is provided adjacent to both of the light source and an exterior case for absorbing the heat generated on the light source and discharge the heated air from an exhaust hole formed on a rear side (opposite side from the projecting direction of the projector) or lateral side of the exterior case.

However, since the suction fan is located adjacent to the exterior case, wind noise is caused by the suction fan when the heated air is discharged from the exhaust hole. Further, the noise of the suction fan itself is more easily transferred to the outside, so that noise is likely to be caused while using the projector.

Further, since the exhaust hole is formed on the rear side or the lateral side of the exterior case, the heated air discharged from the projector is directly blown to the spectators viewing the projected image at the rear or the lateral side of the projector, thereby causing unpleasant feeling to the spectators.

SUMMARY OF THE INVENTION

An object of the present invention is to provide a projector capable of improving cooling efficiency of a light source, securing sufficient silentness and causing no unpleasant feeling to the spectators.

A projector according to an aspect of the present invention has: a light source; a projection optical system that enlarges and projects a light beam irradiated by the light source after being modulated in accordance with image information, where an optical path from the light source to the projection optical system is arranged approximately in planarly-viewed L-shape; and a light source cooling axial-flow fan provided adjacent to the light source with a suction surface thereof extending along the optical axis of the light beam irradiated by the light source, the exhaust direction of the light source cooling axial-flow fan being parallel to the projecting direction of the projection optical system.

According to the present invention, in a projector having a light path shaped in approximately planarly-viewed L-shape from a light source to a projection optical system, since the light source cooling axial-flow fan is adjacent to the light source and the suction surface extends along the optical axis of the light irradiated by the light source, the exhaust direction of the light source cooling axial-flow fan being parallel to the projecting direction of the projection optical system, an exhaust hole of the cooling air formed on the exterior case can be spaced apart from the light source cooling axial-flow fan, so that the wind noise caused by the cooling air blown from the light source cooling axial-flow fan and the sound of the light source cooling axial-flow fan itself can be diminished, thereby securing the silentness while using the projector.

Since the exhaust hole formed on the exterior case is located on a projection side of the projector, the heat wind discharged from the projector is exhausted from the projection side, thereby preventing the heat wind from being blown onto a viewer located on the backside or a lateral side of the projector.

Since the light source cooling axial-flow fan is adjacent to the light source, the air heated by the light source can be efficiently inhaled, thereby avoiding rise in temperature of a light source so that the heat can be prevented from residing inside the projector.

Accordingly, the cooling efficiency of the light source can be sufficiently improved while securing the silentness of the projector and causing no unpleasant feeling on the spectators.

The projector of the present invention may preferably have an exterior case that accommodates the light source and the projection optical system, the exterior case having an exhaust hole that discharges an air inside the exterior case toward outside and a duct that connects a discharge portion of the light source cooling axial-flow fan with the exhaust hole of the exterior case.

According to the above arrangement, since the discharge portion of the light source cooling axial-flow fan and the exhaust hole of the exterior case are connected by the duct, the air discharged by the light source cooling axial-flow fan is discharged from the exhaust hole through the inside of the duct, the exhaust flow can be prevented from colliding with the components of the projector and the inside temperature can be prevented from being raised by avoiding backflow of the exhaust toward the inside of the product, so that the rise in the inside temperature can be prevented and the wind noise can be restrained, thereby improving silentness of the projector.

In the projector according to the present invention, the light source and the projection optical system may preferably be accommodated in an optical component casing approximately of planarly-viewed L-shape, a lamp driving circuit block that drives the light source and/or a power source block for supplying electric power to the lamp driving circuit block may preferably be disposed in a space surrounded by the duct and the casing, and a block cooling axial-flow fan that cools the lamp driving circuit block and/or the power source block may preferably disposed on a side of the projection optical system, the air-flow rate of the block cooling axial-flow fan being smaller than the air-flow rate of the light source cooling axial-flow fan.

According to the above arrangement, since the light source and the projection optical system are accommodated in the optical components casing of approximately planarly-viewed L-shape and the lamp driving circuit block and/or the power source block are disposed in the space surrounded by the duct and the casing, the space inside the projector can be efficiently utilized and the components inside the projector can be highly densely installed, thereby reducing the size of the projector.

In an ordinary arrangement, a projector has a control board installed with a CPU etc. for importing image information to control and operation processing in order to project an optical image in accordance with the image information, and the power source block supplies great electric current with low voltage to the CPU installed on the control board, heat is easily generated.

Further, the lamp driving circuit block has heating elements such as a transforming coil for transforming the electric power from the power source into a predetermined level of power, a capacitor for storing the electric power, and a resistor.

Since the block cooling axial-flow fan is located on a side of the projection optical system, the above-described heat-generating power source block or the lamp driving circuit block can be efficiently cooled, thereby preventing deterioration of the power source block or the lamp driving circuit block.

Further, since the air-flow rate of the block cooling axial-flow fan is smaller than the air-flow rate of the light source cooling axial-flow fan, the heat wind blown from the block cooling axial-flow fan is efficiently inhaled by the light source cooling axial-flow fan and discharged toward the outside of the projector, and the wind noise caused when the heat wind blown by the block cooling axial-flow fan collides with the components of the projector, thereby reducing the noise while using the projector can be reduced.

In the projector according to the present invention, the block cooling axial-flow fan may preferably be covered with a duct for guiding a cooling air toward the lamp driving circuit block and/or the power source block.

According to the above arrangement, since the block cooling axial-flow fan is covered with a duct for guiding the cooling air to the lamp driving circuit block and/or the power source block, the cooling air inhaled and discharged by the block cooling axial-flow fan is securely introduced to the lamp driving circuit block and/or the power source block through the inside of the duct, thereby improving the cooling efficiency of the lamp driving circuit block and/or the power source block.

DETAILED DESCRIPTION OF PREFERRED EMBODIMENT(S)

An embodiment of the present invention will be described below with reference to the attached drawings.

1. Primary Arrangement of Projector

Figure 1:
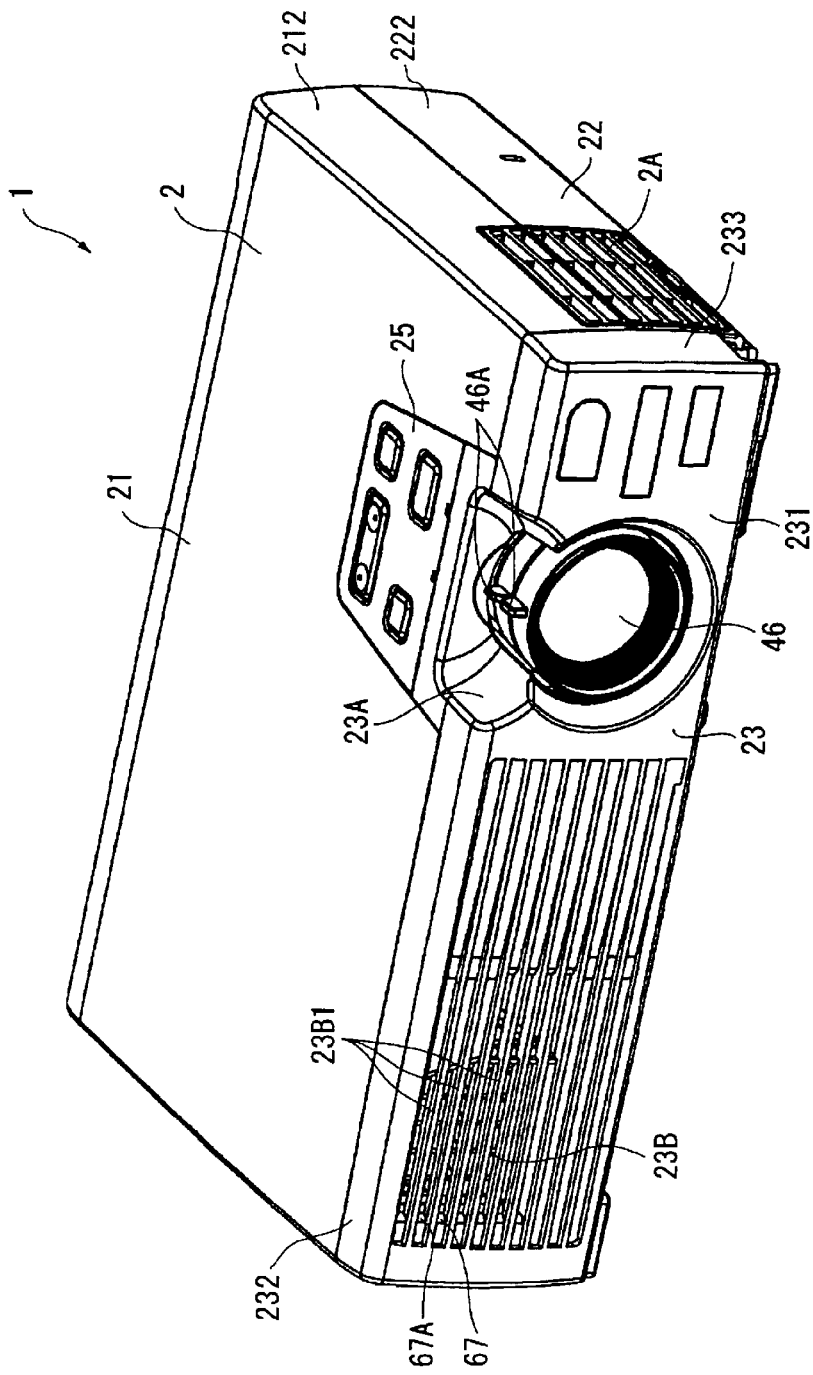
FIG. 1 is an entire perspective view of a projector seen from above according to an embodiment of the present invention.
Figure 2:
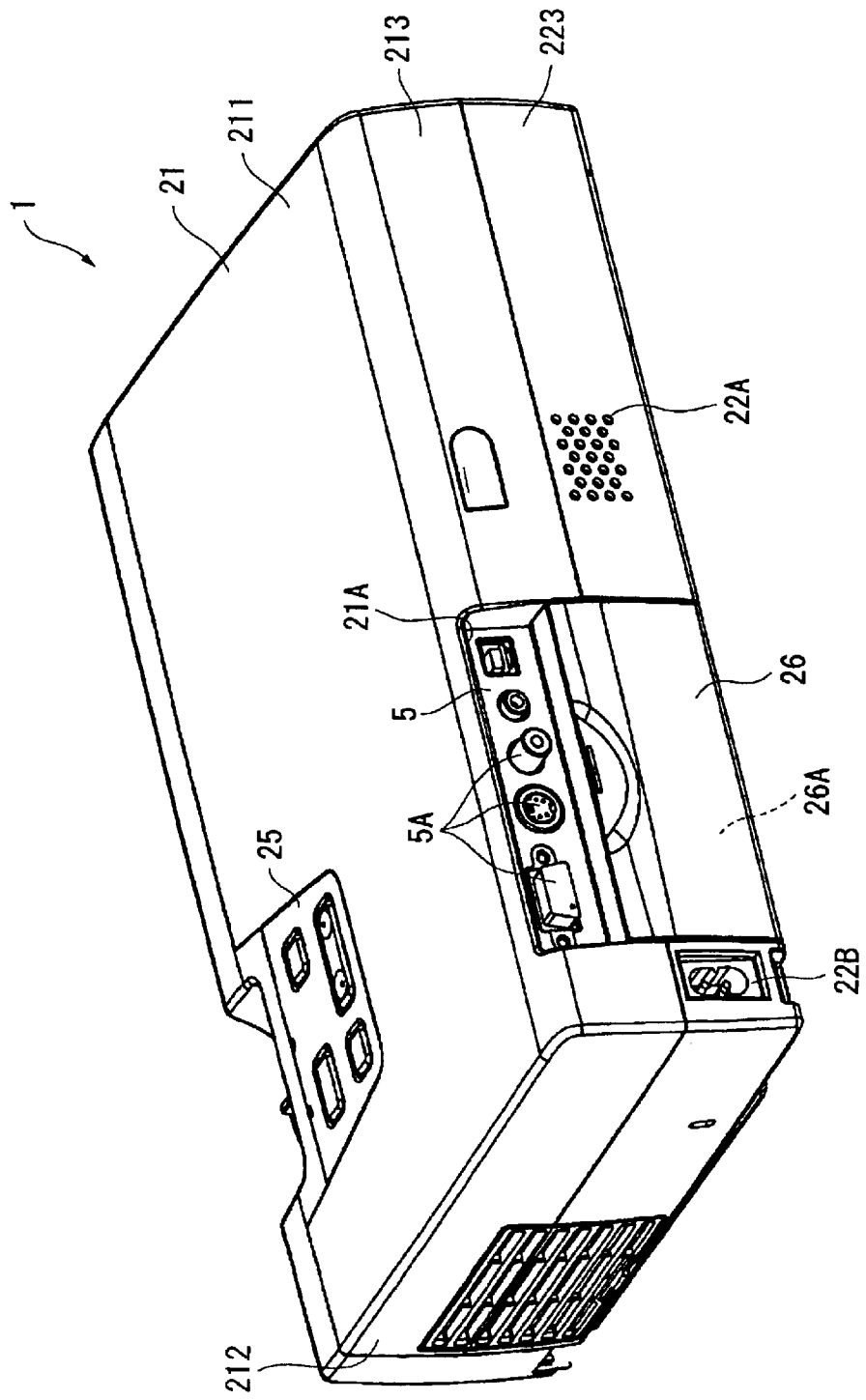
FIG. 2 is an entire perspective view of the projector seen from back side according to the aforesaid embodiment.
Figure 3:
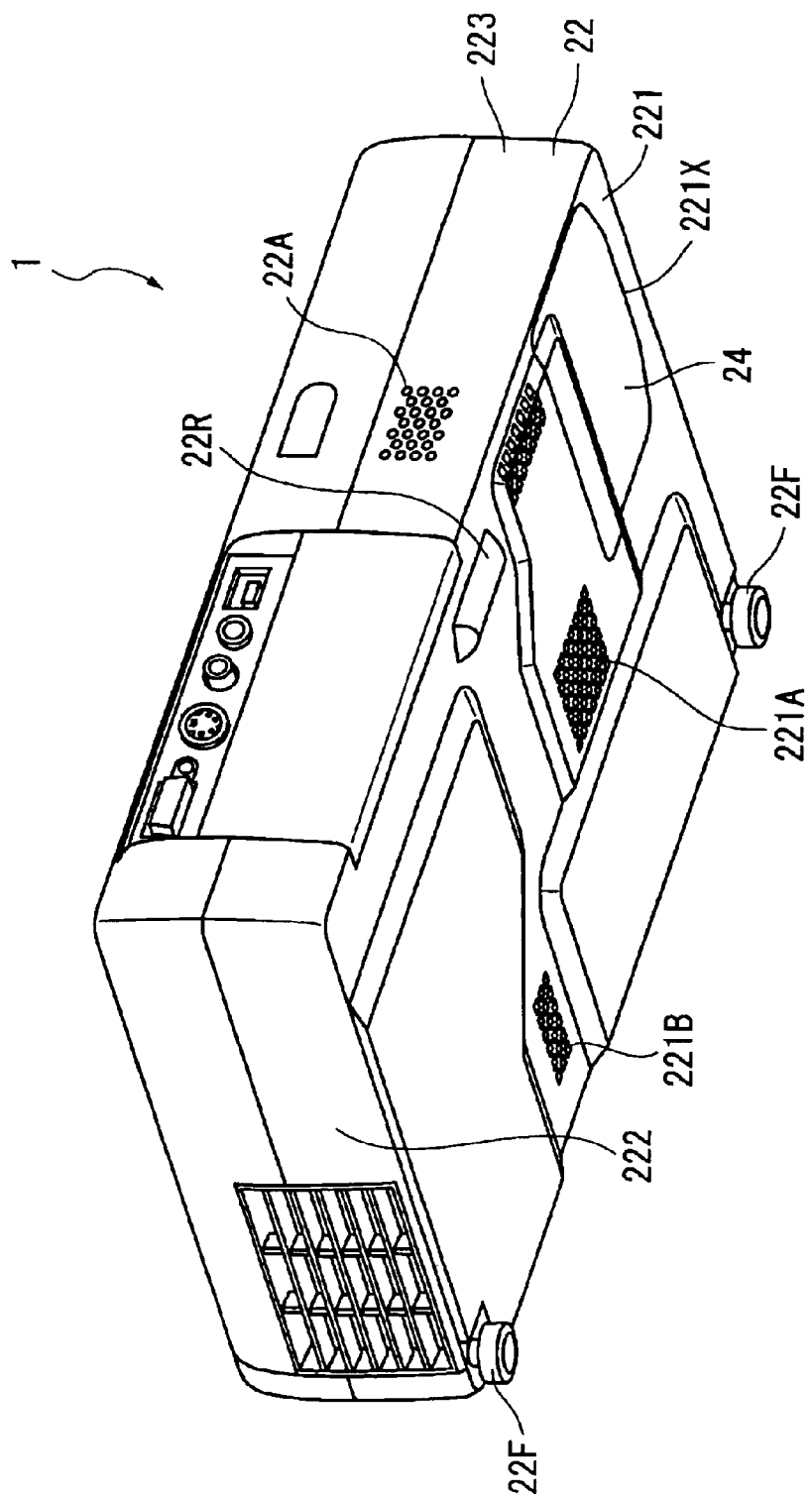
FIG. 3 is an entire perspective view of the projector seen from below according to the aforesaid embodiment.

FIG. 1 is a perspective view of a projector 1 seen from above according to an embodiment of the present invention. FIG. 2 is a perspective view of the projector 1 seen from back side. FIG. 3 is a perspective view of the projector 1 seen from below.

As shown in FIGS. 1 to 3, the projector 1 has an exterior case 2 of approximately rectangular parallelepiped.

The exterior case 2 is a casing for accommodating a body of the projector 1, which includes an upper case 21, a lower case 22 and a front case 23 spanning over the front side of the cases 21 and 22. The cases 21 to 23 are respectively made of synthetic resin material.

As shown in FIG. 2, the upper case 21 includes an upper portion 211, a side portion 212 and a rear portion 213 respectively constituting the top side, lateral side and rear side of the projector 1.

An operation panel 25 is provided on the front side of the upper portion 211.

A recess 21A spanning over the rear side of the upper portion 211 and the rear portion 213 is formed on the back side of the operation panel 25 on the upper case 21. A part of a circuit board 5 accommodated in the exterior case 2 is exposed to the outside from the recess 21A. The part of the circuit board 5 exposed to the outside is various connectors 5A constituting an interface. External devices are connected to the projector 1 through the connectors 5A.

As shown in FIG. 3, the lower case 22 includes a bottom portion 221, a side portion 222 and a rear portion 223 respectively constituting the bottom side, lateral side and rear side of the projector 1.

An opening 221X is formed on the bottom portion 221. A lamp cover 24 fitted to the rectangular opening 221X in a detachable manner. Further, inlet holes 221A and 221B for inhaling the cooling air from the outside are formed on the bottom portion 221.

A rear leg 22R constituting one of the legs of the projector 1 is formed approximately at the center on the rear side of the bottom portion 221. Further, front legs 22F also constituting the legs of the projector 1 are respectively provided on the right and left corners on the front side of the bottom portion 221. In other words, the projector 1 is supported on three points by the rear leg 22R and the two front legs 22F.

The two front legs 22F are vertically advanceable and retractable for adjusting the tilting (attitude of the projector 1) in front and rear directions and right and left directions to adjust position of the projected image.

As shown in FIG. 2, a remote controller storage 26 is formed on the rear portion 223 under the connector 5A. A remote controller 26A for remotely operating the projector 1 is accommodated in the remote controller storage 26.

Further, in FIG. 2, a speaker hole 22A is formed on the right of the remote controller storage 26 on the rear portion 223 and an inlet connector 22B is provided on the left of the remote controller storage 26.

As shown in FIG. 1, the front case 23 includes a front portion 231, a top portion 232 and a side portion 233 respectively constituting the front side, top side and lateral side of the projector 1.

An opening 23A spanning over the front portion 231 and the top portion 232 is formed on the front case 23. A projection lens 46 is disposed inside the exterior case 2 corresponding to the opening 23A. A part of the projection lens 46 is exposed to the outside from the opening 23A, so that zooming operation and focusing operation of the projection lens 46 can be manually conducted through a lever 46A as a part of the exposed portion.

An exhaust hole 23B is formed on the front portion 231 on a side opposite to the opening 23A. A duct 6B for guiding the air inside the projector 1 is provided inside the exhaust hole 23B and an exhaust hole 67A of the duct 6B opposes to the exhaust hole 23B. A plurality of horizontally arranged vanes 23B1 are formed on the exhaust hole 23B, the vanes 23B1 regulating the cooling air discharged from the exhaust hole of the exhaust duct 6B and blocking the light from the inside and the outside.

As shown in FIG. 1, an inlet hole 2A spanning over the side portion 212 of the upper case 21 and the side portion 222 of the lower case 22 is formed on the lateral side of the exterior case 2. A sirocco fun not illustrated in FIGS. 1 to 3 is provided inside the inlet hole 2A.

Figure 4:
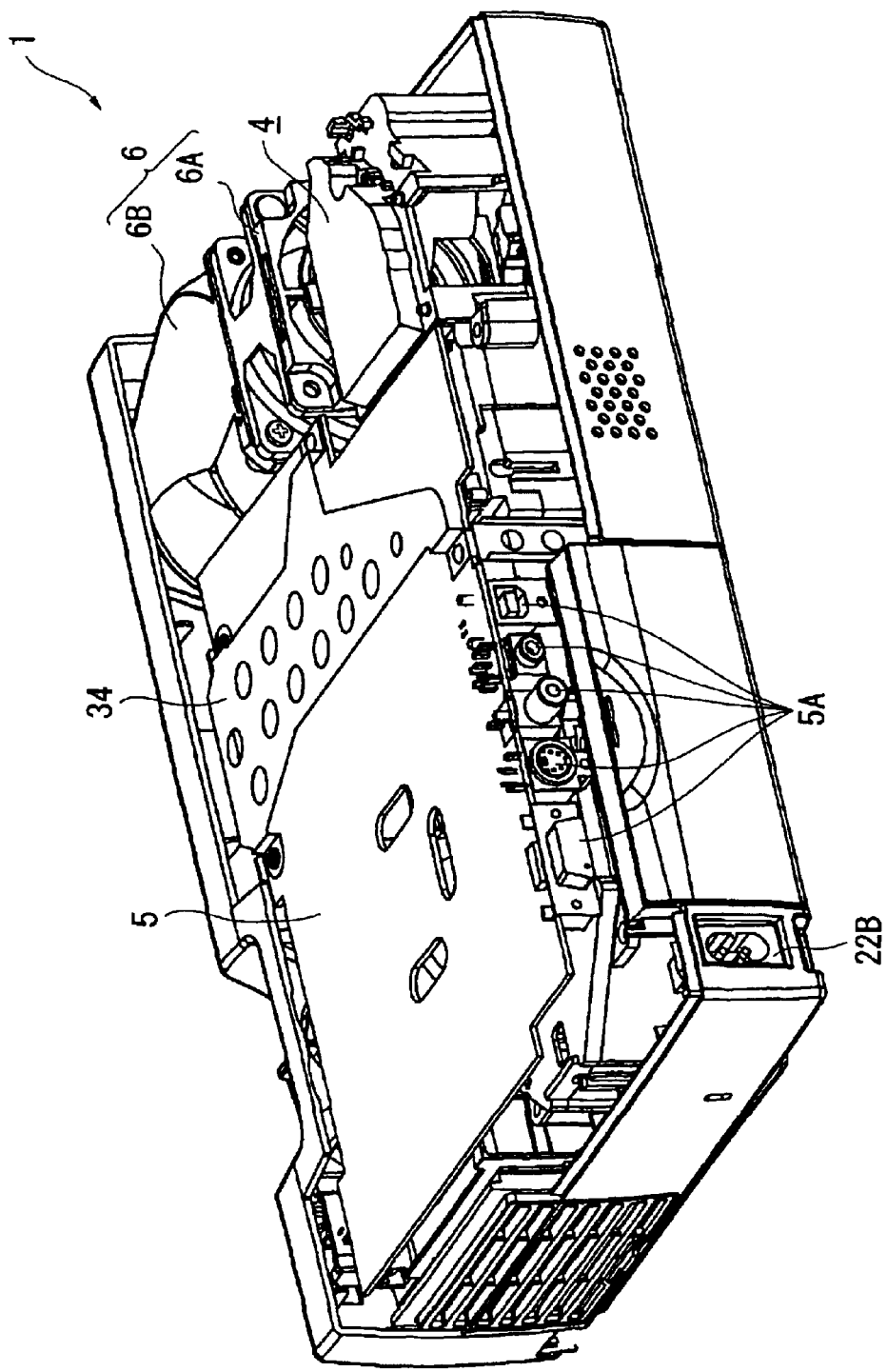
FIG. 4 is a perspective view showing the inside of the projector according to the aforesaid embodiment, which specifically shows the projector with upper case thereof being removed from the condition shown in FIG. 2.
Figure 5:
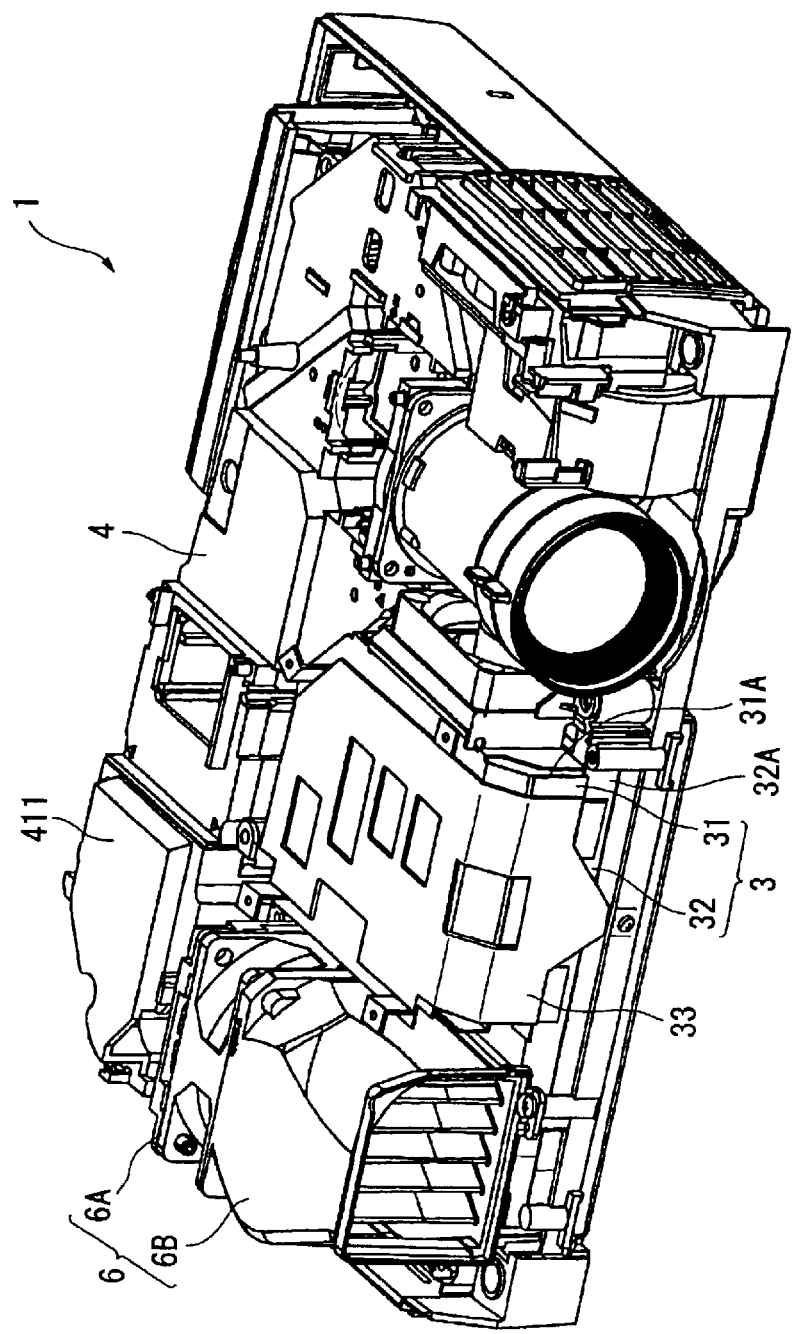
FIG. 5 is a perspective view showing the inside of the projector according to the aforesaid embodiment, which specifically shows the projector seen from front side with upper shield plate and circuit board thereof being removed from the condition shown in FIG. 4.

FIGS. 4 and 5 are perspective views showing the inside of the projector 1.

Specifically, FIG. 4 is an illustration where the upper case 21 of the projector 1 is removed from the condition shown in FIG. 2. FIG. 5 is an illustration seen from the front side where the front case 23, an upper shield 34, and a circuit board 5 are removed from the condition shown in FIG. 4.

As shown in FIG. 4 or 5, the exterior case 2 is provided with a power source unit 3 disposed at approximately center of the front side of the projector 1, an optical unit 4 having approximately planarly-viewed L-shape disposed on the rear side and right side of the power source unit 3, the circuit board 5 disposed above the units 3 and 4, and an exhaust duct unit 6 disposed on an end of the optical unit 4 toward the front side.

The power source unit 3 includes a power source 31 and a lamp driving circuit 32 disposed below the power source 31.

The power source 31 supplies the electric power from the outside to the lamp driving circuit 32, the circuit board 5 etc. through a not-illustrated power cable connected to the inlet connector 22B.

The lamp driving circuit 32 supplies electric power fed by the power source 31 to a light source lamp (not shown in FIGS. 4 and 5) constituting the optical unit 4, which is electrically connected to the light source lamp. The lamp driving circuit 32 is, for instance, wired to a not-illustrated board.

The power source 31 and the lamp driving circuit 32 are vertically arranged approximately in parallel, which occupy the space extending in right and left direction on the front side of the projector 1.

The power source 31 and the lamp driving circuit 32 are respectively covered with case members 31A and 32A having right and left sides being opened, the surface of the case members 31A and 32A being processed by plating, metal vacuum evaporation, foliation etc. The case members 31A and 32A prevent leakage of electromagnetic noise between the power source 31 and the lamp driving circuit 32 and works as a duct for introducing the cooling air.

The power source 31 and the lamp driving circuit 32 are covered with a metal lower shield 33 having rectangular opening, so that electromagnetic noise from the power source 31 and the lamp driving circuit 32 toward the outside can be prevented.

Figure 6:
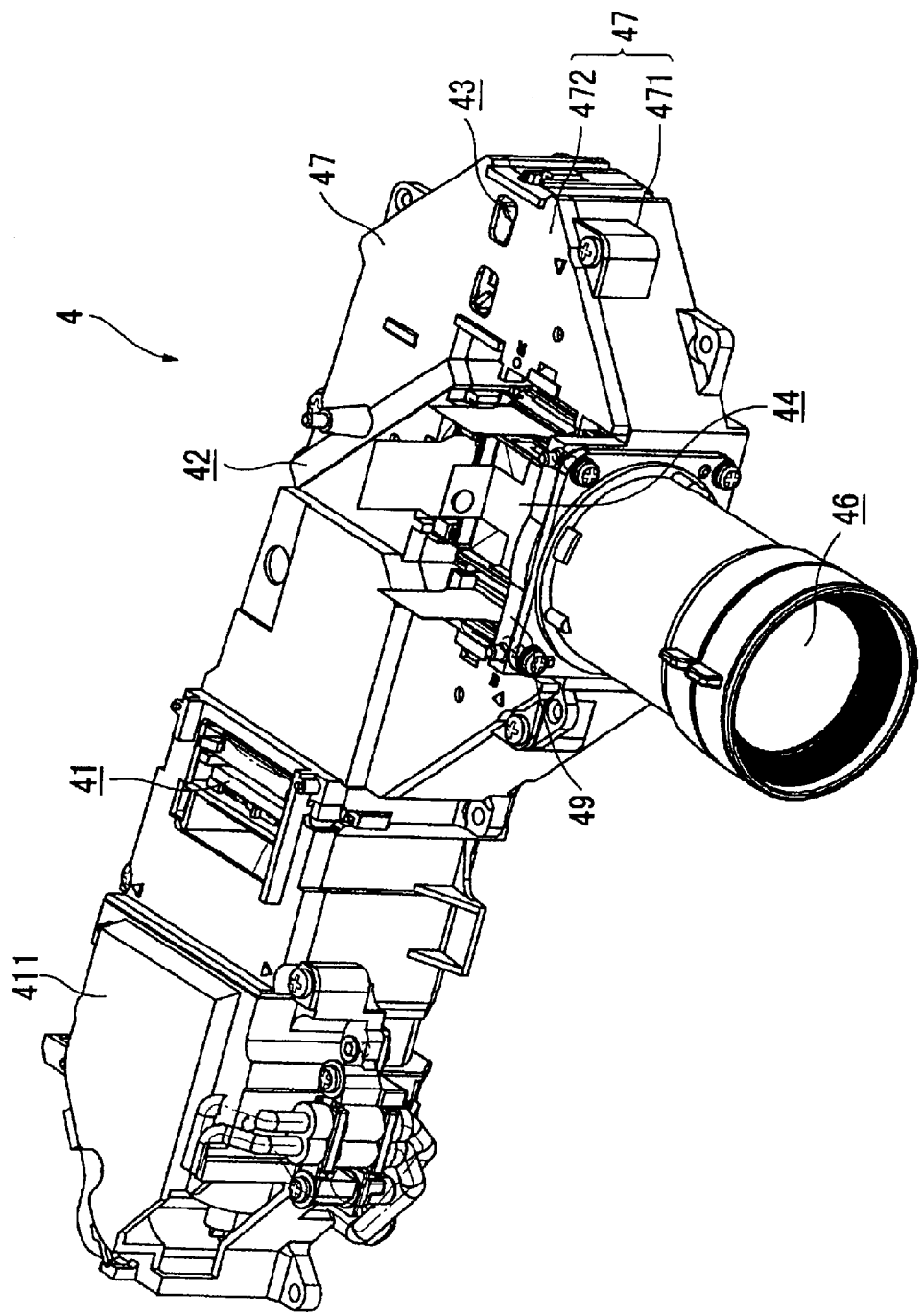
FIG. 6 is a perspective view showing an optical unit seen from above according to the aforesaid embodiment.

FIG. 6 is a perspective view showing an optical unit 4.

As shown in FIG. 6, the optical unit 4 optically processes the light beam irradiated by the non-illustrated light source lamp constituting a light source 411 to form an optical image in accordance with image information and enlarges and projects the optical image, which includes an integrator illuminating optical system 41, a color separating optical system 42, a relay optical system 42, an optical device 44, the projection lens 46 and a light guide 47 for accommodating the optical components 41 to 46. The details of the optical unit 4 will be described below.

Though not specifically shown in FIG. 4, the circuit board 5 is a single substrate installed with a controller including a CPU etc. and an interface including the various connectors 5A as a connection terminal, in which the controller controls the liquid crystal panel constituting the optical device 44 in accordance with the image information inputted through the connector 5A.

As shown in FIGS. 4 and 5, the circuit board 5 is provided on the upper side of the lower shield 33. Further the metallic upper shield 34 is disposed above the circuit board 5. The upper shield 34 and the lower shield 33 are mutually fixed with the circuit board 5 sandwiched therebetween. Accordingly, the leakage of the electromagnetic noise from the power source unit 3 and the circuit board 5 toward the outside can be prevented.

As shown in FIG. 4 or 5, the exhaust duct unit 6 exhausts the air staying within inside the projector 1 to the outside of the projector 1, which includes an axial-flow fan 6A and the exhaust duct 6B.

2. Detailed Construction of Optical Unit

Figure 7:
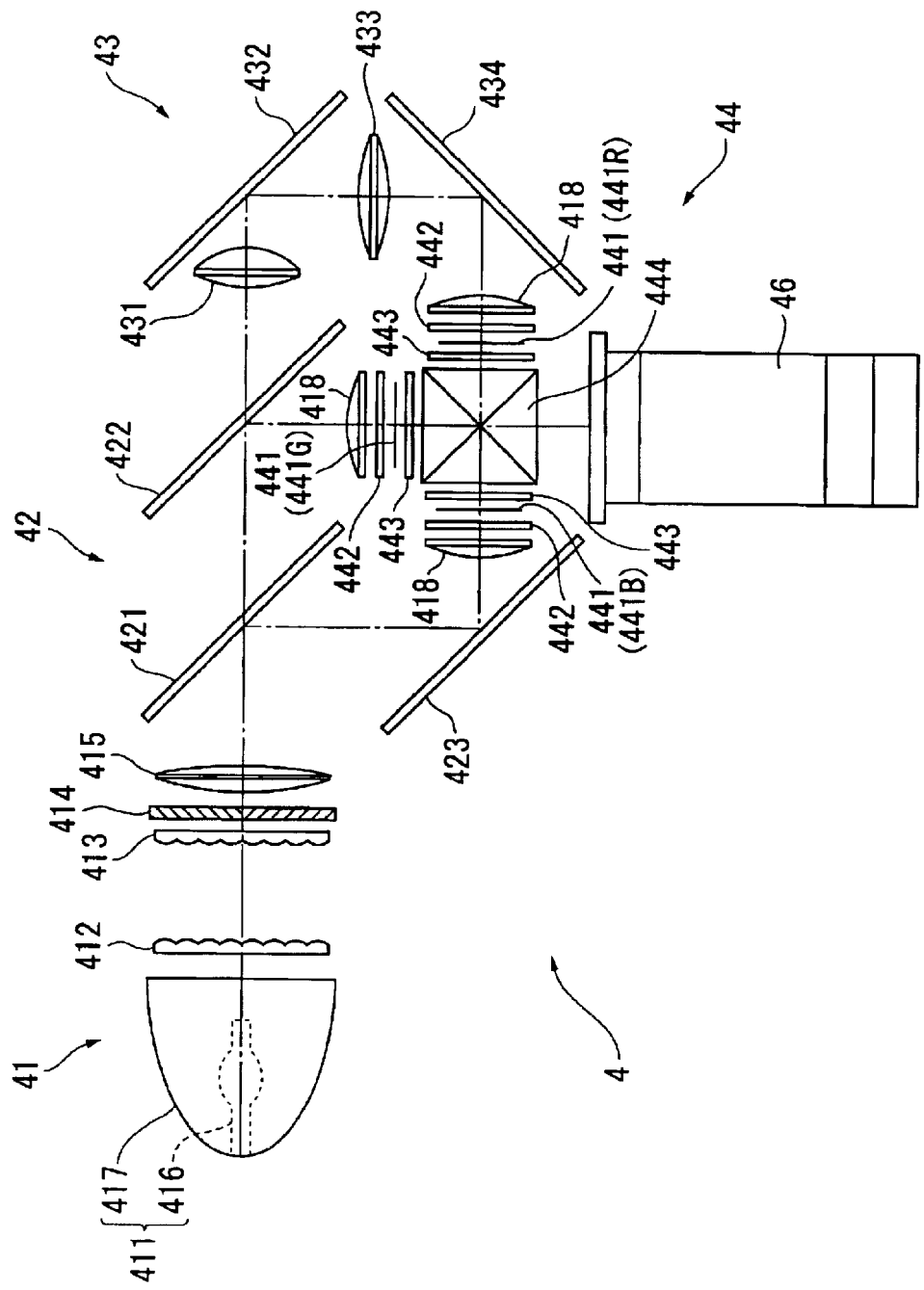
FIG. 7 is a plan view schematically showing an optical unit according to the aforesaid embodiment.

FIG. 7 is a plan view schematically showing the optical unit 4 shown in FIG. 6.

As shown in FIG. 7, the optical unit 4 includes the integrator illuminating optical system 41, the color separating optical system 42, the relay optical system 43, the optical device 44 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Figure 8:
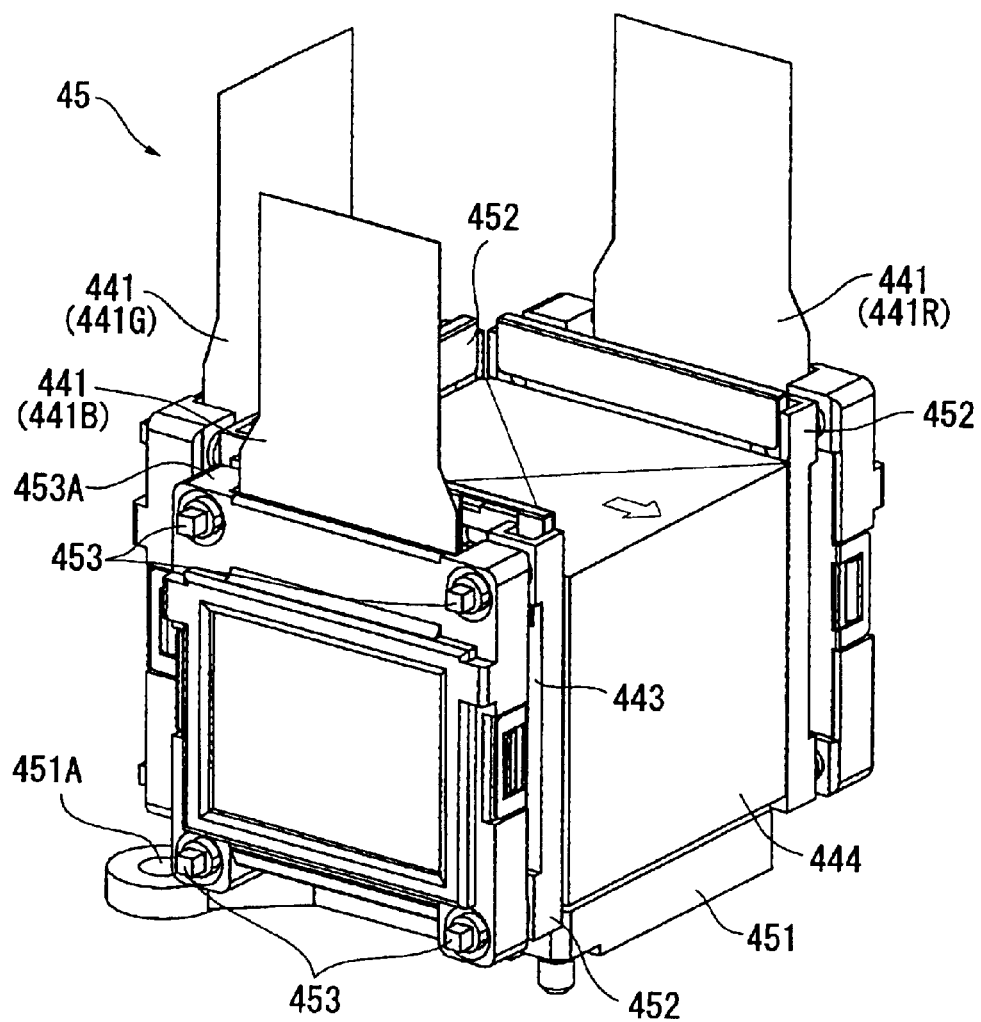
FIG. 8 is a perspective view showing an optical device integrating a liquid crystal panel and a prism seen from above according to the aforesaid embodiment.

FIG. 8 is a perspective view showing the optical device body 45.

As shown in FIG. 8, the optical device body 45 has the cross dichroic prism 444, a metal base 451 for supporting the cross dichroic prism 444 from the lower side, a metal holding plate 452 for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate 452. A predetermined gap is secured between the holding plate 452 and the liquid crystal panel 441, so that the cooling air is flowed through the gap.

As shown in FIG. 7, the projection lens 46 enlarges and projects the color image combined by the cross dichroic prism 444 of the optical device 44.

The above-described optical systems 41 to 44 are accommodated in the light guide 47 made of synthetic resin as an optical component casing as shown in FIG. 6.

Though not specific illustration of the inside of the light guide 47 is omitted, as shown in FIG. 6, the light guide 47 has a lower light guide 471 having the groove for the respective optical components 412 to 415, 418, 421 to 423, 431 to 434 and 442 shown in FIG. 7 to be slidably fitted from the above, and a lid-shaped lower light guide 472 for closing the upper opening side of the lower light guide 471.

Further, as shown in FIG. 6, the light source 411 is accommodated on an end of the light guide 47 of approximately planarly-viewed L-shape, and the projection lens 46 is screwed and fixed on the other end through a head 49.

3. Structure of Power Source Unit

The power source 3 is disposed in a space surrounded by the optical unit 4 of planarly-viewed L-shape and the exhaust duct unit 6 closely located to a side of the exterior case 2 as shown in FIG. 5, where the power source 31, the lamp driving circuit 32 and the circuit board 5 are superposed.

Figure 9:
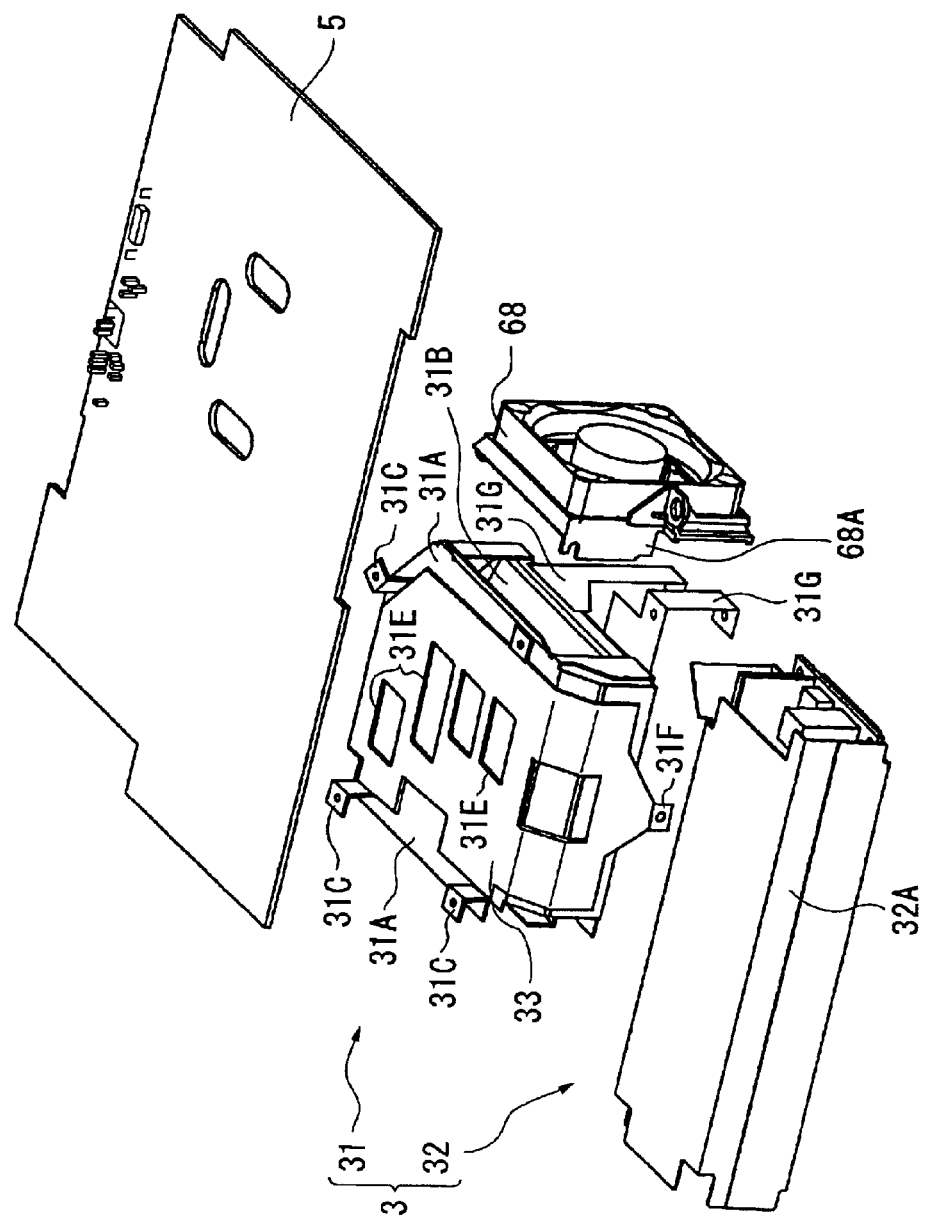
FIG. 9 is an exploded perspective view showing a power source unit according to the aforesaid embodiment.

As shown in FIG. 9, the power source 31 has a power source board 31B having a not-illustrated transformer, a converter for converting an output from the transformer into a predetermined voltage. for supplying electric power to the lamp driving circuit 32, circuit board 5 etc.

The circumference of the power source board 31B is surrounded by the case member 31A having opened right and left sides of which surface is processed by plating, metal vacuum evaporation and foliation in order to prevent leakage of electromagnetic noise from the installed circuit component toward the outside, and the lower shield 33 having rectangular opening, the components blocking electromagnetic noise toward the circuit board 5 and the lamp driving circuit 32.

The lower shield 33 has support portions 31C projecting from the respective corners of the upper side thereof for supporting the circuit board 5 disposed above the power source 31.

Further, a plurality of holes 31E are formed for preventing the heat from residing in the inside from getting hot, the plurality of holes 31E radiating the heat generated on the case member 31A heated by a heat-generating component installed on the power source board 31B.

On the bottom side of the lower shield 33, a case fixing portion 31G projecting from the opening on the side of the projection lens 46 at the bottom side toward downside for fixing to the lower case 22 is formed.

On the front side of the lower shield 33, a lamp driving circuit fixing portion 31F extending from the front side toward downside to be connected to the lamp driving circuit 32 for integrating the power source 31 and the lamp driving circuit 32 is formed.

The lamp driving circuit 32 is installed with a transformer for transforming the electric power from the power source 31 to a predetermined power, a capacitor for storing the electric power, resistor etc. on a board thereof, which is covered with the case member 32A as in the power source board 31B. The case member 32A blocks the electromagnetic noise from the circuit component installed on the lamp driving circuit 32 to prevent leakage of the electromagnetic noise toward the power source 31, the circuit board 5 and the outside of the projector 1.

A hole (not shown) is formed on the board of the lamp driving circuit 32 corresponding to the lamp driving circuit fixing portion 31F, through which the lamp driving circuit 32 and the power source 31 are integrated by screwing or riveting.

An axial fan 68 is disposed spanning over the opening of the case members 31A and 32A on the side of the projection lens 46, the axial-flow fan 68 cooling both of the power source 31 and the lamp driving circuit 32.

A peripheral end of the case members 31A and 32A of the axial-flow fan 68 is covered by an insulative duct 68A for securing airflow toward the case members 31A and 32A.

The air-flow rate of the axial-flow fan 68 is set less than the air-flow rate of the axial-flow fan 6A of the exhaust duct unit 6, so that the air transferred from the axial-flow fan 68 is drawn to the axial-flow fan 6A of the exhaust duct unit 6.

4. Structure of Exhaust Duct Unit

As shown in FIG. 4 or 5, the exhaust duct unit 6 is disposed adjacent to one end of the planarly-L-shaped optical unit 4 on which the light source 411 is located along the exterior case 2. The exhaust side of the exhaust duct unit 6 opposes to the exhaust hole 23B on the front side of the upper case 21.

The exhaust duct unit 6 is composed of axial-flow fan 6A located adjacent to the light source 411 and the exhaust duct 6B connected to the axial-flow fan 6A.

The axial-flow fan 6A inhales the air heated inside the projector 1 and exhausts the air from the exhaust hole 23B through the exhaust duct 6B.

The axial-flow fan 6A is provided adjacent to the side of the exterior case 2 with the suction surface thereof being opposed to the light source 411. In other words, the exhaust flow discharged from the axial-flow fan 6A is discharged in a direction to be away from the light source 411 and in parallel to the image projecting direction from the projection lens 46.

An end of the exhaust duct 6B is connected to the exhaust side of the axial-flow fan 6A, the exhaust duct 6B being made of synthetic resin as the exterior case 2 and extending along the side of the exterior case 2 to the front side of the exterior case 2. The exhaust hole 23B is opposes to the opening of the other end of the exhaust duct 6B.

Figure 10:
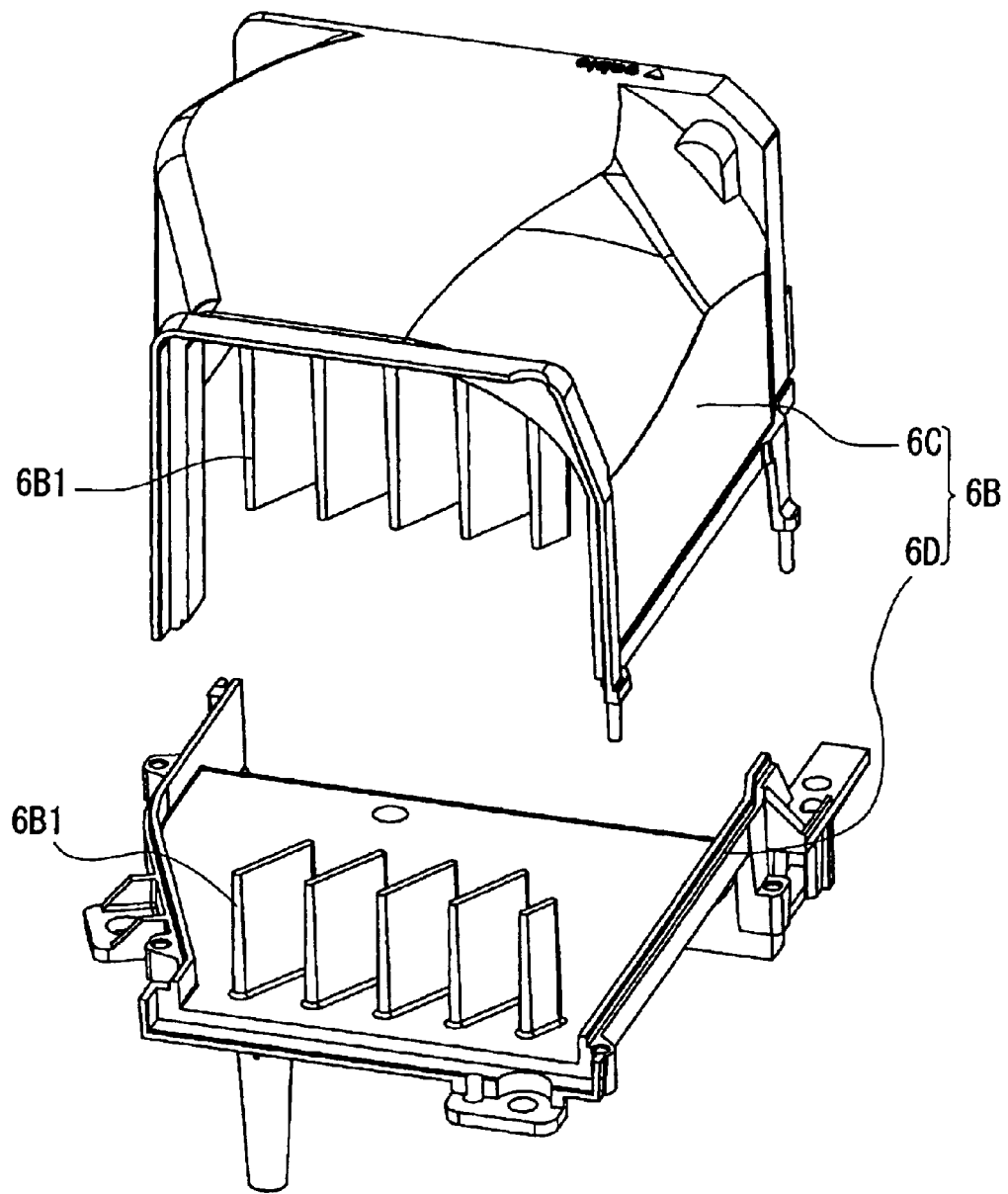
FIG. 10 is an exploded perspective view showing a structure of an exhaust duct according to the aforesaid embodiment.

As shown in FIG. 10, the exhaust duct 6B has a louver 6B1 for controlling the direction of the exhaust flow, the louver 6B1 being formed by integrally combining an upper duct 6C and a lower duct 6D formed by injection molding etc.

The louver 6B1 is vertically mounted on the top side and bottom side of the exhaust duct 6B and is tilted so that the exhaust flow is discharged in a direction away from the image formation area.

Further, the entire exhaust duct 6B has approximately rectangular parallelepiped configuration having smaller opening area on the other side, thus enhancing the discharge pressure of the exhaust flow and flow-control effect by the louver 6B1.

5. Cooling Structure

The projector 1 has a panel cooling system A for mainly cooling the liquid crystal panel 441, a light source cooling system B for mainly cooling the light source 411 and a power source cooling system C for mainly cooling the power source unit 3.

Figure 11:
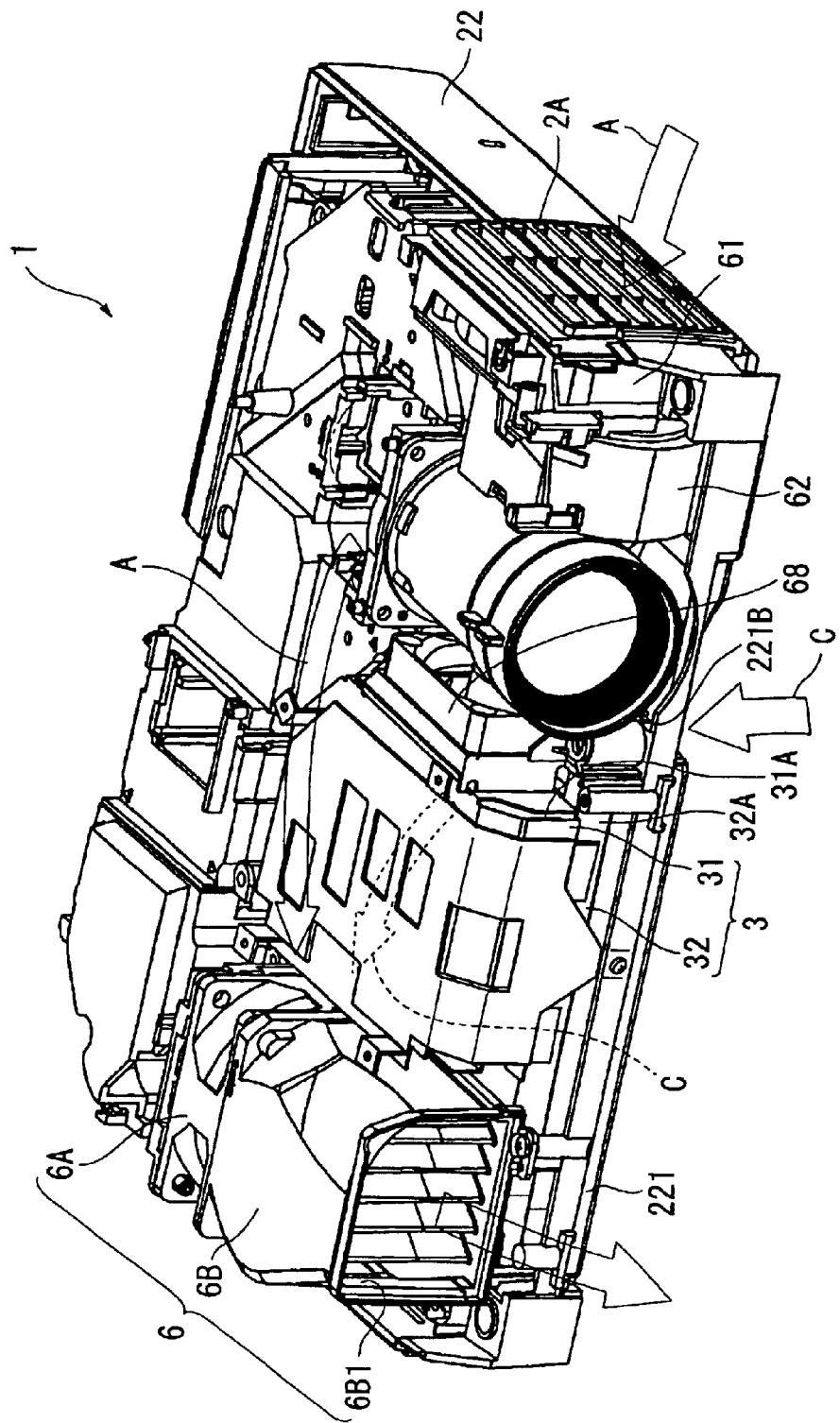
FIG. 11 is an illustration showing a flow of cooling air of a panel cooling system A and a power source cooling system C according to the aforesaid embodiment.
Figure 12:
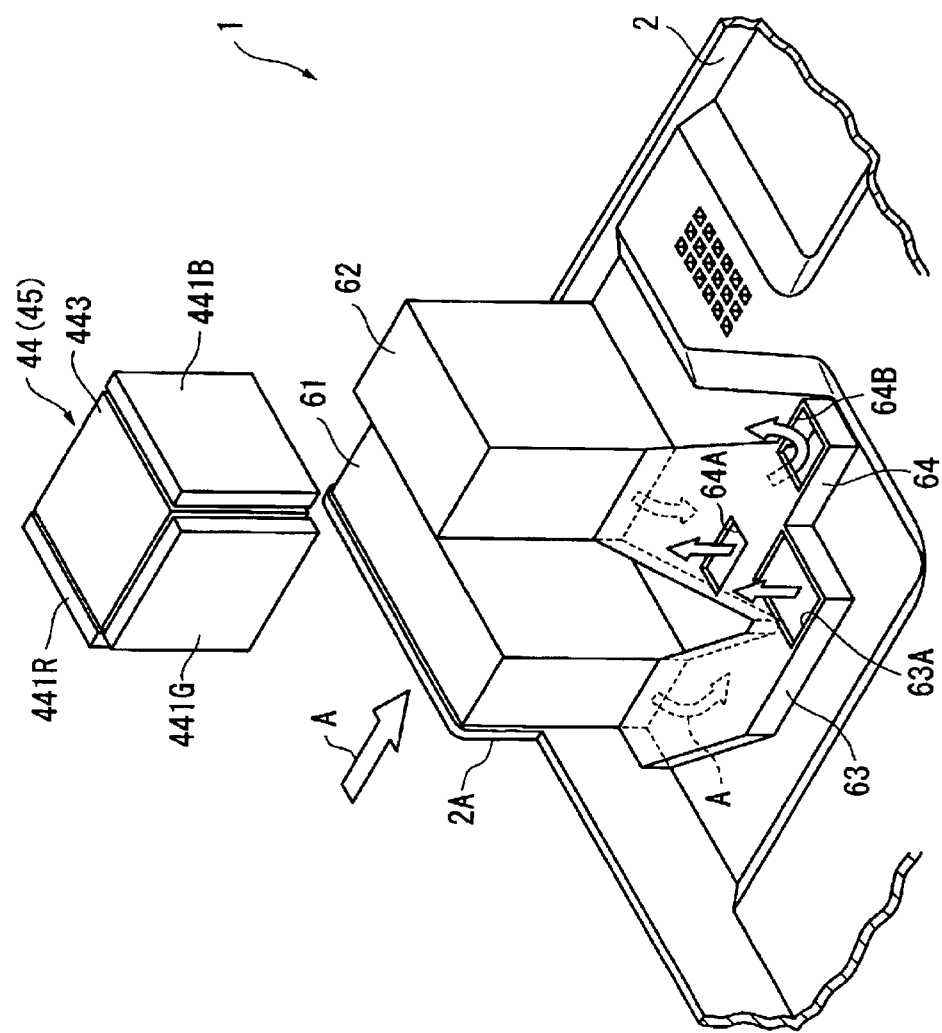
FIG. 12 is an illustration showing a flow of cooling air of a panel cooling system A according to the aforesaid embodiment.
Figure 13:
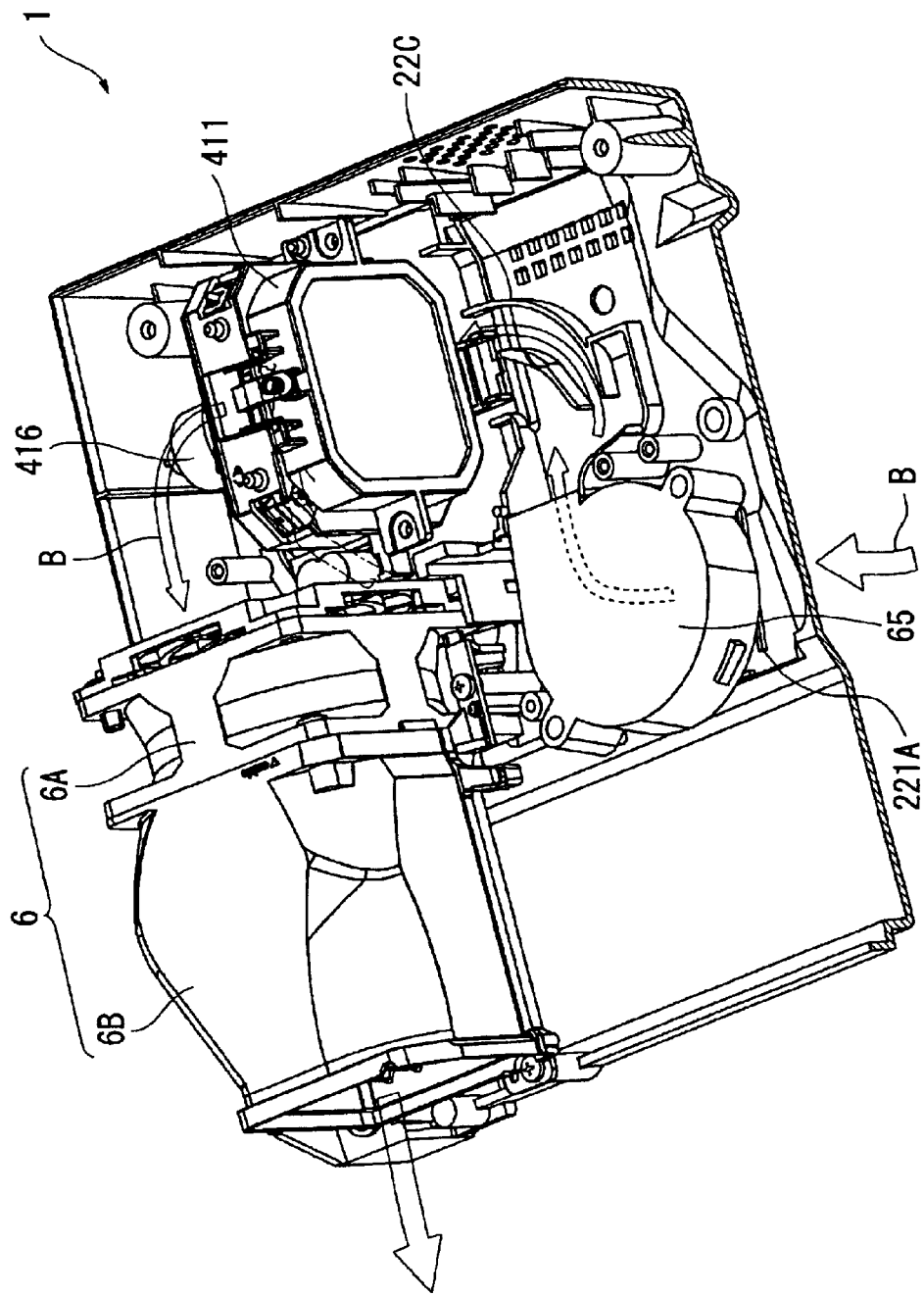
FIG. 13 is an illustration showing a flow of cooling air of a light source cooling system B according to the aforesaid embodiment.

FIG. 11 is an illustration identical with FIG. 5 adding arrows indicating airflow of the cooling air, which shows the flow of the cooling air inside the projector 1 including the power source cooling system C. FIG. 12 is a perspective view schematically showing the structure of the lower side of the optical device 44 for explaining the panel cooling system A. FIG. 13 is a perspective view showing the structure on the lower side of the power source unit 3 and the light guide 47 for explaining the light source cooling system B.

In FIG. 11, two sirocco fans 61 and 62 are disposed on the right side of the projection lens 46 in the panel cooling system A. Further, as shown in FIG. 12, ducts 63 and 64 respectively connected to the fans 61 and 62 are used in the panel cooing system A.

As shown in FIG. 12, the sirocco fans 61 and 62 inhale outside cooling air from the inlet hole 2A on a side of the exterior case 2 and discharge the inhaled cooling air to the ducts 63 and 64 respectively. Incidentally, the size of the sirocco fan 62 is greater than the sirocco fan 61.

The duct 63 guides the cooling air discharged by the sirocco fan 61 toward lower side of the optical device 44, where a rectangular opening 63A is formed at a position corresponding to the lower side of the liquid crystal panel 441G for green color light.

The duct 64 guides the cooling air discharged by the sirocco fan 62 to the lower side of the optical device 44, where rectangular openings 64A and 64B are respectively formed at a position corresponding to the lower side of the liquid crystal panels 441R and 441B respectively for red color light and blue color light.

Though not shown, an opening is formed on the bottom side of the lower light guide at a position corresponding to the openings 63A, 64A and 64B.

Accordingly, as shown in FIG. 12, the cooling air inhaled by the sirocco fans 61 and 62 of the panel cooling system A flows to cool the incident-side polarization plate and the irradiation-side polarization plate which is not illustrated in FIG. 12, in addition to the respective liquid crystal panels 441R, 441G and 441B.

Further, as shown in FIG. 11, the cooling air which has cooled the liquid crystal panels 441R, 441G and 441B upwardly from the lower side is drawn to the side of the axial-flow fan 6A on the left side viewed from the front side while cooling the lower side of the circuit board (not shown in FIG. 11) and is discharged from the exhaust hole on the front side of the exterior case (not shown in FIG. 11).

In FIG. 13, a sirocco fan 65 provided on the lower side of the power source unit 3, the axial-flow fan 6A and the exhaust duct 6B attached to the axial-flow fan 6A are used in the light source cooling system B.

The cooling air inhaled from the inlet hole 221A of the lower case 22 by the sirocco fan 65 flows along a guide 22C formed on the inner side of the bottom portion 221 of the lower case 22 and, thereafter, enters in the light source 411 to cool the light source lamp 416 to be flowed out toward the outside of the light source 411. The cooling air flowed out of the light source 411 is drawn by the axial-flow fan 6A in the same manner as the panel cooling system A to be discharged from the exhaust hole on the front side of the exterior case (not shown in FIG. 13) through the exhaust duct 6B.

In FIG. 11, an axial-flow fan 68 provided on the right side of the power source unit 3 is used in the power source cooling system C.

The cooling air inhaled by the axial-flow fan 68 from the inlet hole 221B formed on the bottom portion 221 of the lower case 22 flows from the right side to the left side viewed from the front side along the case members 31A and 32A while cooling the power source 31 and the lamp driving circuit 32. Subsequently, most of the cooling air is drawn by the axial-flow fan 6A as in the other cooling system A and B and is discharged from the not-illustrated exhaust hole on the front side of the exterior case. Incidentally, a part of the air is directly discharged from the exhaust hole of the exterior case without being drawn by the axial-flow fan 6A.

6. Advantages of Embodiment

According to the above-described present embodiment, following advantages can be obtained.

(1) In the optical unit 4 formed in approximately planarly-viewed L-shape, the light source 411 is disposed on an end of the optical unit 4 and the axial-flow fan 6A of the exhaust duct unit 6 is located adjacent to the light source 411 with the suction surface thereof opposed to the light source 411. Accordingly, the exhaust flow of the axial-flow fan 6A becomes parallel to the image projecting direction of the projection lens 46, the exhaust hole 23B formed on the front side of the exterior case 2 can be spaced apart from the axial-flow fan 6A, and the wind noise by the cooling air blown by the axial-flow fan 6A and the sound of the axial-flow fan 6A itself can be diminished, thereby securing silentness while the projector 1 is used.

(2) Since the exhaust hole 23B for discharging the air heated inside the projector 1 is located on the image projection side of the projector 1, the heat wind discharged by the projector 1 is exhausted from the projection side, thereby preventing the heat wind from being blown to the spectators positioned on the rear side or lateral side of the projector 1.

(3) Since the suction surface of the axial-flow fan 6A of the exhaust duct unit 6 is located adjacent to the opening of the light source 411, the air heated by the light source 411 can be efficiently inhaled, thereby avoiding rise in temperature of the light source lamp and the reflector 417 of the light source 411 to avoid the heat from being kept inside the projector 1.

(4) Since the exhaust surface of the axial fan 6A of the exhaust duct unit 6 and the exhaust hole 23B formed on the front side of the exterior case 2 are connected by the exhaust duct 6B, the air discharged by the axial-flow fan 6A is discharged from the exhaust hole 23B through the inside of the exhaust duct 6B, so that the collision of the exhaust flow with the components of the projector 1 can be prevented, thereby restraining the wind noise to improve silentness of the projector 1.

(5) Since the power source 31 and the lamp driving circuit 32 constituting the power source unit 3 are disposed in a spaced enclosed by the exhaust duct unit 6 and the optical unit 4 and are superposed in the thickness direction of the circuit board 5, the components inside the projector 1 can be highly densely installed, thereby effectively utilizing the inside space of the projector 1 to reduce the size of the projector 1.

(6) Since the axial-flow fan 68 opposes to the opening of the case member 31A of the power source 31 and the case member 32A of the lamp driving circuit 32, the cooling air can be efficiently blown to the heat-generating component of the power source 31 and the lamp driving circuit 32, thereby preventing deterioration of the power source 31 and the lamp driving circuit 32.

(7) Since the air-flow rate of the axial-flow fan 68 is set smaller than the air-flow rate of the axial-flow fan 6A of the exhaust duct unit 6, the air blown by the axial-flow fan 68 is drawn by the axial-flow fan 6A of the exhaust duct unit 6 to be discharged through the exhaust duct 6B, so that the wind noise caused when the air blown by the axial-flow fan 68 collides with the components of the projector 1 can be diminished, thereby reducing the noise while using projector.

(8) Since the duct 68A is formed on the exhaust-side peripheral edge of the axial-flow fan 68, the cooling air can be efficiently taken inside the case members 3 1A and 32A, thereby improving the cooling efficiency of the power source 31 and the lamp driving circuit 32.

7. Modifications

Incidentally, the scope of the present invention is not restricted to the above embodiment, but includes other arrangement as long as an object of the present invention can be achieved, which includes following modifications.

Though the exhaust duct 6B of the exhaust duct unit 6 is formed by combining the upper duct 6C and the lower duct 6D formed by injection molding etc., the exhaust duct 6B may be integrally formed.

Though the louver 6B1 formed on the exhaust side of the exhaust duct 6B has a linear configuration along the exhaust direction, curved configuration along the exhaust direction is possible, which may be arranged in any manner as long as the exhaust flow is not exhausted toward the image projection side.

Though a projector using three optical modulators is taken as an example in the above-described embodiment, the present invention can be applied to a projector having a single, two, or more than three optical modulators.

Though the liquid crystal panel is used as the optical modulator, an optical modulator other than liquid crystal such as a device using a micro-mirror may be used.

Though a transmission-type optical modulator having different light-incident side and light-irradiation side is used in the above-described embodiment, a reflection-type optical modulator having common light-incident side and light-irradiation side may be used.

Though a front-type projector where the image is projected from a direction for viewing the screen is taken as an example in the above-described embodiment, the present invention may be applied to a rear-type projector where the image is projected from a direction opposite to the direction for viewing the screen.

What is claimed is:

1. A projector comprising:
   a light source;
   a projection optical system that enlarges and projects a light beam irradiated by the light source after being modulated in accordance with image information, where an optical path from the light source to the projection optical system is arranged approximately in planarly-viewed L-shape;
   a light source cooling axial-flow fan provided adjacent to the light source with a suction surface thereof extending along the optical axis of the light beam irradiated by the light source;
   an exterior case that accommodates the light source and the projection optical system, the exterior case having an exhaust hole that discharges an air inside the exterior case toward outside; and
   a duct that connects a discharge portion of the light source cooling axial-flow fan with the exhaust hole of the exterior case,
   wherein the light source cooling axial-flow fan exhausts a cooling air in the projecting direction of the projection optical system.

2. The projector according to claim 1,
   wherein the light source and the projection optical system are accommodated in an optical component casing approximately of planarly-viewed L-shape,
   wherein a lamp driving circuit that drives the light source and/or a power source for supplying electric power to the lamp driving circuit is disposed in a space surrounded by the duct and the casing, and
   wherein a cooling axial-flow fan that cools the lamp driving circuit and/or the power source is disposed on a side of the projection optical system, the air-flow rate of the cooling axial-flow fan being smaller than the air-flow rate of the light source cooling axial-flow fan.

3. The projector according to claim 2, wherein the cooling axial-flow fan is covered with a duct for guiding a cooling air toward the lamp driving circuit and/or the power source.

* * * * *